United States Patent
Ghatage et al.

(10) Patent No.: US 11,899,727 B2
(45) Date of Patent: Feb. 13, 2024

(54) DOCUMENT DIGITIZATION, TRANSFORMATION AND VALIDATION

(71) Applicant: ACCENTURE GLOBAL SOLUTIONS LIMITED, Dublin (IE)

(72) Inventors: Prakash Ghatage, Bangalore (IN); Kumar Viswanathan, San Jose, CA (US); Nirav Jagdish Sampat, Mumbai (IN); Naveen Kumar Thangaraj, Salem (IN); Kaustubh Kurhekar, Pune (IN); Ullas Balan Nambiar, Bangalore (IN)

(73) Assignee: ACCENTURE GLOBAL SOLUTIONS LIMITED, Dublin (IE)

( * ) Notice: Subject to any disclaimer, the term of this patent is extended or adjusted under 35 U.S.C. 154(b) by 163 days.

(21) Appl. No.: 17/461,503

(22) Filed: Aug. 30, 2021

(65) Prior Publication Data

US 2023/0067069 A1 Mar. 2, 2023

(51) Int. Cl.
*G06F 16/93* (2019.01)
*G06N 20/00* (2019.01)
(Continued)

(52) U.S. Cl.
CPC ............ *G06F 16/93* (2019.01); *G06F 18/217* (2023.01); *G06F 18/40* (2023.01); *G06N 20/00* (2019.01);
(Continued)

(58) Field of Classification Search
CPC ........ G06F 16/93; G06F 18/217; G06F 18/40; G06N 20/00; G06V 30/413; G06V 30/416
(Continued)

(56) References Cited

U.S. PATENT DOCUMENTS 10,318,593 B2 6/2019 Ghatage et al.
11,049,235 B2 * 6/2021 Wheaton ................. G06F 16/93
(Continued)

FOREIGN PATENT DOCUMENTS

EP 3798956 A1 3/2021

OTHER PUBLICATIONS

Nguyen et al., "Survey of Post-OCR Processing Approaches", ACM Computing Surveys, vol. 54, No. 6, Jul. 13, 2021, pp. 1-37.

*Primary Examiner* — Hosain T Alam
*Assistant Examiner* — Nicholas E Allen
(74) *Attorney, Agent, or Firm* — Mannava & Kang, P.C.

(57) ABSTRACT

An Artificial Intelligence (AI) based document digitization, transformation and validation system extracts fields from digital documents via different document digitization processes. A document packet with a plurality of documents is initially accessed and any non-digital documents in the document packet are digitized. The errors in the digitized documents are corrected and non-English documents are translated into English. Each of the documents is provided to a plurality of digitization services for the extraction of fields by a plurality of field extraction models. If a field has multiple field instances extracted by more than one digitization service, then a field instance with the highest confidence score is selected for inclusion into the consolidated results. The consolidated results produced in different JavaScript Object Notation (JSON) formats are converted into a common JSON format which may be further validated and provided to downstream processes.

20 Claims, 13 Drawing Sheets

(51) Int. Cl.
    *G06V 30/413*    (2022.01)
    *G06V 30/416*    (2022.01)
    *G06F 18/21*     (2023.01)
    *G06F 18/40*     (2023.01)

(52) U.S. Cl.
    CPC .......... *G06V 30/413* (2022.01); *G06V 30/416* (2022.01)

(58) Field of Classification Search
    USPC ........................................................ 707/608
    See application file for complete search history.

(56) References Cited

U.S. PATENT DOCUMENTS

| | | | |
|---|---|---|---|
| 11,087,081 B1* | 8/2021 | Srivastava | G06F 40/169 |
| 2018/0373711 A1* | 12/2018 | Ghatage | G06V 30/412 |
| 2019/0236350 A1* | 8/2019 | Kozlovsky | G06F 40/151 |
| 2019/0238708 A1* | 8/2019 | Kozlovsky | G06F 16/93 |
| 2020/0279015 A1* | 9/2020 | Lu | G06Q 10/067 |
| 2020/0334456 A1* | 10/2020 | Sridharan | G06V 30/19173 |
| 2020/0387553 A1* | 12/2020 | Tyulyaev | G06F 18/2413 |
| 2020/0394431 A1* | 12/2020 | Ramachandra | G06F 40/44 |
| 2021/0110527 A1* | 4/2021 | Wheaton | G06T 7/0002 |
| 2021/0218858 A1* | 7/2021 | Mavani | G06Q 20/0425 |

* cited by examiner

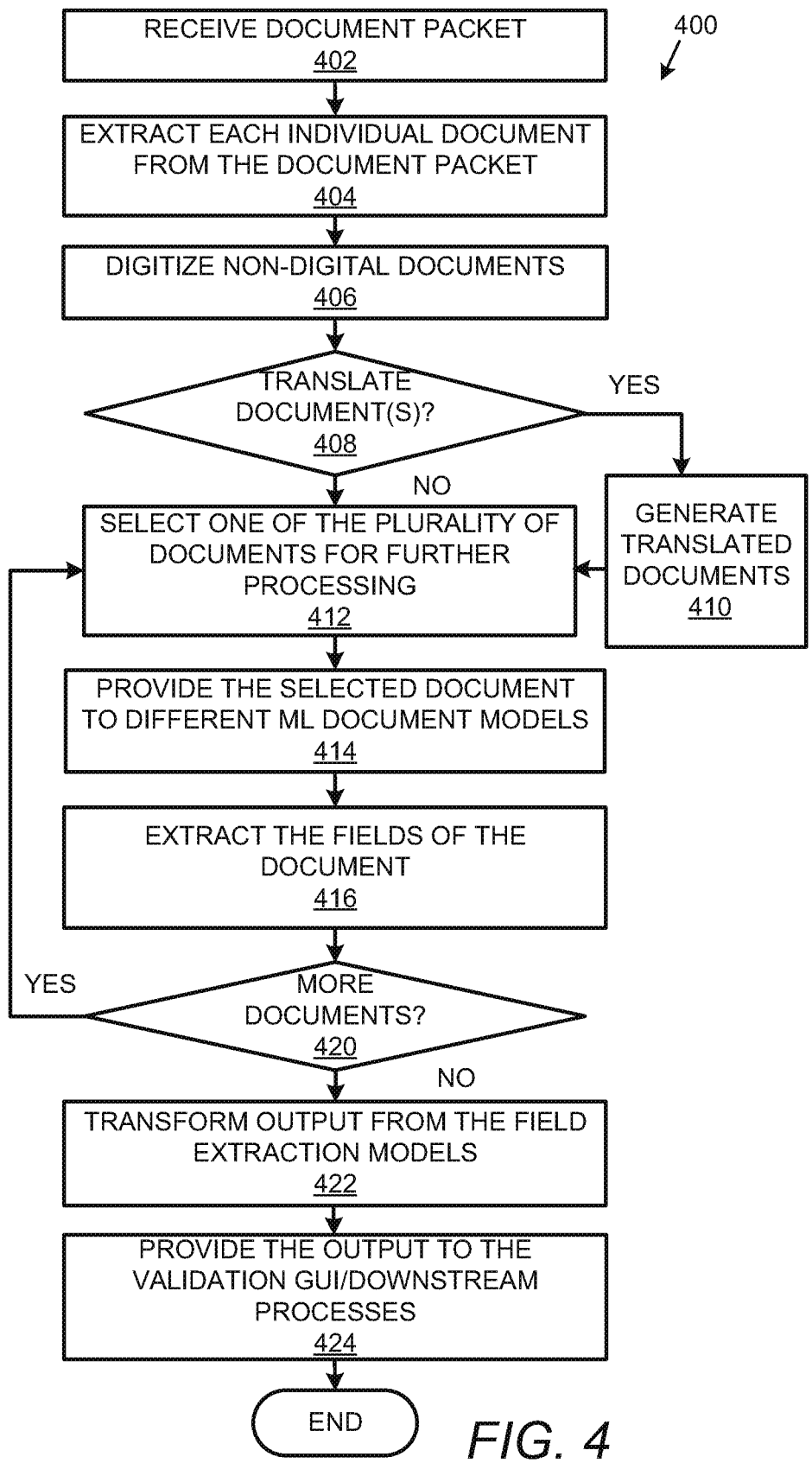

DOCUMENT DIGITIZATION, TRANSFORMATION AND VALIDATION

BACKGROUND

Document management involves the use of computer systems and related software to store, manage and track electronic documents and image information captured from paper documents using optical scanners. While early document management systems required manual data entry, information from documents is increasingly loaded into the computer systems via mechanical, optical, and/or computational methods. One technique to load information from images and store it in a useful format on a computer system includes optical character recognition (OCR) which is the electronic or mechanical conversion of images of typed, handwritten, or printed text into machine-encoded text. OCR is extensively used for data entry from printed paper data records such as passport documents, invoices, bank statements, computerized receipts, or other such suitable documentation. It is a common method of digitizing printed texts so that they can be electronically edited, searched, stored more compactly, displayed, and used in processes such as robotic process automation (RPA) and other automatic processes.

BRIEF DESCRIPTION OF DRAWINGS

Features of the present disclosure are illustrated by way of examples shown in the following figures. In the following figures, like numerals indicate like elements, in which:

FIG. 4 shows a flowchart that details a method of processing documents in accordance with the examples disclosed herein.

FIG. 8 shows field extraction by different models in accordance with the methods described herein.

FIG. 10 shows an example of a common JSON format generated in accordance with the methods disclosed herein.

FIG. 11 shows an example of a validation graphical user interface (GUI) generated in accordance with the examples disclosed herein.

DETAILED DESCRIPTION

Figure 1:
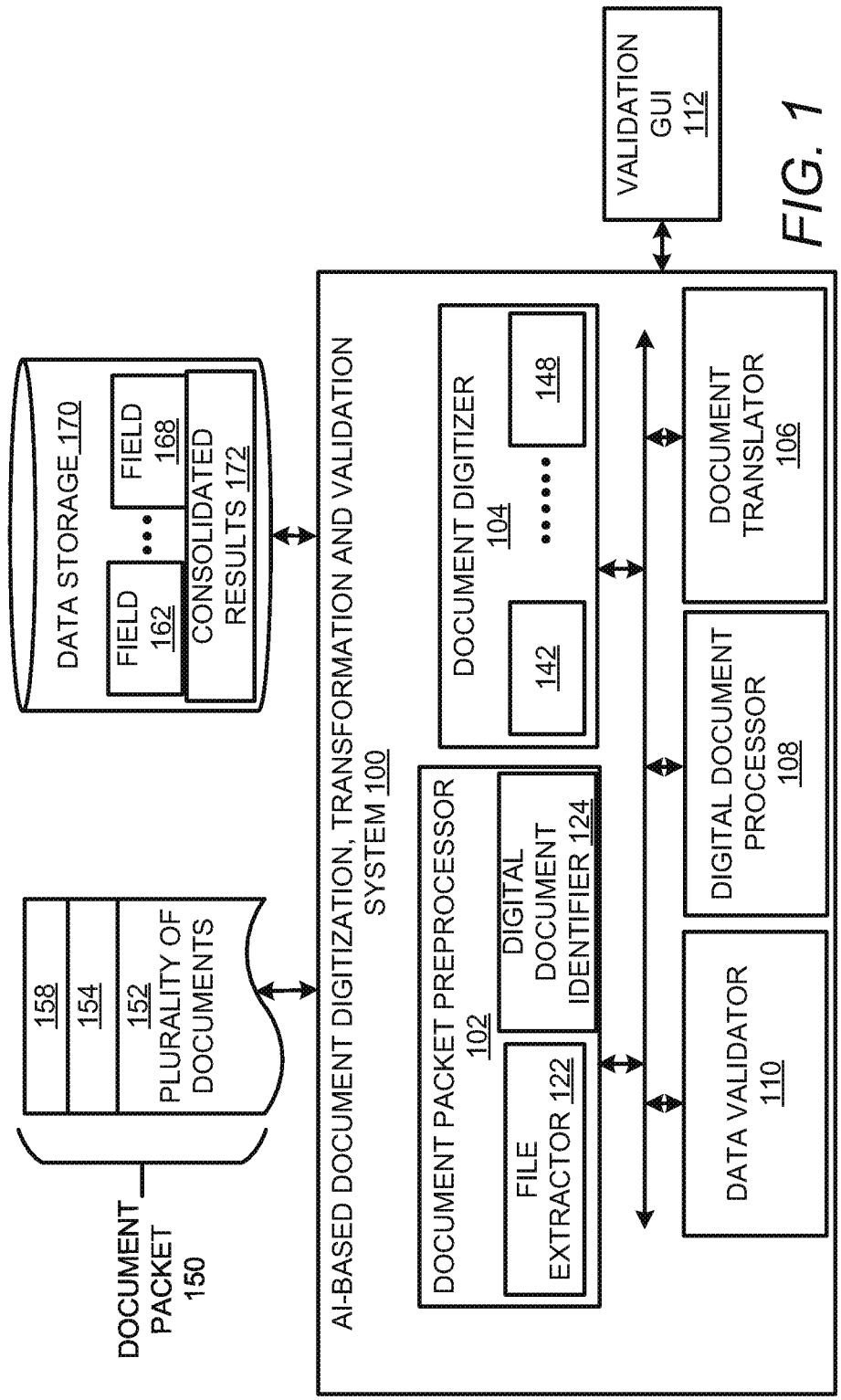
FIG. 1 shows a block diagram of an Artificial Intelligence (AI)-based document digitization, transformation and validation system in accordance with the examples disclosed herein.

For simplicity and illustrative purposes, the present disclosure is described by referring to examples thereof. In the following description, numerous specific details are set forth in order to provide a thorough understanding of the present disclosure. It will be readily apparent however that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

1. Overview

An AI-based document digitization, transformation and validation system is disclosed. The document validation system receives a document packet that includes at least one document or a plurality of documents, extracts data from the fields of the plurality of documents, and provides the fields for the user validation and/or downstream processes. The plurality of documents in the document packet can include digital and non-digital documents. Digital documents are those with machine-recognizable content (textual data, image data, etc.) that can be searched and readily extracted. The plurality of documents may also include documents of different languages so that both English and/or non-English documents may be included in the document packet. Additionally, the document packet can Include metadata describing the plurality of documents contained therein. The plurality of documents can be associated with a common purpose, such as a job application, a loan application, or other purposes. The metadata accompanying the document packet can include a description of the documents in addition to other information, such as the number of pages for each document.

The document validation system can employ a plurality of digitization services for digitizing the non-digital documents and four accurately extracting data from the plurality of documents. The document validation system can be configured to individually identify each document of the document packet as an initial step. The non-digital documents in the document packet can be digitized using the plurality of digitization services. Therefore, for each non-digital document, multiple digitized document versions can be produced by the plurality of digitization services. A confidence score is associated with each of the multiple digitized document versions. The confidence scores can be compared and one of the multiple digitized document versions can be selected for further processing.

The digital versions of the plurality of documents are analyzed to determine the language of each document. If one or more non-English documents are identified, such documents are translated into English using translation services The English versions of the plurality of documents are analyzed for error identification and correction. Different identification techniques based on measured metrics such as but not limited to weight ratio, edit distance, and the ratio of term lengths can be used to identify content errors domain errors, and spelling errors. Content errors can include factual errors in content, while domain errors can include errors pertaining to domain information while spelling errors can include errors due to minor informalities such as typos. Different correction techniques can be applied such as but not limited to, content correction, domain correction, and spelling correction. Therefore, corrections can be implemented at different granularities from sentences, words, and character levels.

The plurality of documents are then processed for field extraction. A field of a document can include a piece of data or name/value pairs that can be extracted from the document. The fields can be extracted from the plurality of documents by one or more ML document models included in the plurality of digitization services. A digitization service can include at least one ML document model although more than one ML document model may also be included. In an example, an ML document model can be trained for individual classification of a corresponding document type. Each ML document model can include corresponding field extraction models, wherein each field extraction model can be trained to extract a specific field. Accordingly, an ML document model that is trained for a specific type of document e.g., the passport can include field extraction models that are trained to extract fields that generally occur in passports such as, the issuer country, name, and date of birth on the passport, passport number, issue date, expiry date, etc. Custom field extraction models which are not associated with any specific ML document models or digitization services can also be trained and used to extract unique fields that occur infrequently in certain types of documents.

During field extraction, each document can be provided to the plurality of digitization services. Multiple field instances can be extracted for each field in the document by one or more of the plurality of digitization services. If a field has duplicate field instances, then confidence scores of the duplicate field instances can be compared and the field instance with the highest confidence score can be selected for inclusion into consolidated results which are provided as the output of the document extraction process. Therefore, the consolidated results can include a single field instance for each field wherein different field instances may be generated by multiple digitization services. Furthermore, the output from the different field extraction models associated with different ML document models may be produced in different JSON formats. The document validation system is configured to transform the outputs in the different JSON formats into a common format. The consolidated results that are generated in the common format can be provided via a validation GUI for review and approval. The consolidated results in the common format can also be provided to enable downstream processes.

The AI-based document processing system disclosed herein provides a technical solution to the technical problem of accurate data extraction from non-digital documents. While current states of OCR data extraction technologies serve adequately for digital documents, data extraction from non-digital documents such as scanned images is more challenging, error-prone, and far below the human level of accuracy. Modern OCR applications are especially poor in processing documents with poor image quality, some alphabets like less commonly used Arabic fonts, handwriting, and cursive handwriting. Different OCR technologies have been developed with different capacities. Certain OCR platform has been configured for data extraction from specific documents to improve accuracy. However, in some cases, a single OCR platform may not provide the requisite accuracy. The AI-based document validation system disclosed herein employs the plurality of digitization services and selects results with the highest confidence scores. Furthermore, the document validation system is configured to harmonize the results produced by the different digitization platforms in different formats by converting the corresponding outputs into a common format. By producing the consolidated results in the common format, the document validation system makes optimal use of the various digitization technologies to produce the most accurate results possible.

2. System Architecture

FIG. 1 shows a block diagram of an AI-based document digitization, transformation and validation system 100 in accordance with the examples disclosed herein. The document validation system 100 receives a document packet 150 including a plurality of documents 152, 154, . . . , 158, and extracts various fields 162, . . . , 164, from the plurality of documents 152, . . . , 158. The various fields 162, . . . , 164, can be provided for user validation via a validation GUI 112 and/or for automating downstream processes. The plurality of documents 152, 158, can include digitized and non-digital documents with typed, printed, or even handwritten textual content. Examples of documents in the document packet 150 may include but are not limited to, structured documents such as Know Your Customer (KYC) documents which may include application forms, claim forms, enrollment forms, etc., semi-structured documents which may include invoices, bills of shipment, purchase orders, salary stubs, etc., or unstructured documents such as but not limited to, contracts, or offer letters, insurance policy documents, etc. The content in the plurality of documents 152, . . . , 158 can be printed, typed, or handwritten.

The document validation system 100 can be configured to digitalize any non-digital documents from the data packet 150 and extract the required information from the digitized versions. In an example, the document packet 150 can be received via modalities such as but not limited to, email inboxes, Secure File transfer protocol (SFTP) sites, scanners that create images or non-editable files from paper documents, or web Application Programming Interfaces (APIs), etc. In an example, a user providing the document packet 150 may also provide metadata identifying different documents included in the document packet 150 along with the number of pages associated with each document.

The document validation system 100 includes a document packet preprocessor 102, a document digitizer 104, a document translator 106, a digital document processor 108, and a data validator 110. The document packet preprocessor 102 can further include a file extractor 122 and a digital document identifier 124. The file extractor 122 can extract individual documents from the document packet 150 i.e., extract each document of the plurality of documents 152, . . . , 158, as separate files, using the metadata associated with the document packet 150. The metadata may be explicitly provided by the user or implicitly included in the document packet 150. In an example, the document packet preprocessor 102 can implement rule-based classification to individually identify each document from the document packet 150. The file extractor 122 can include a machine-learning (ML) based classifier or a rule-based classifier for splitting the document packet 150 into separate files so that each file includes an individual document of the plurality of documents 152, . . . , 158. The digital document identifier 124 can analyze each of the separate files to determine if the file is digital or non-digital document based at least on the metadata associated with the document. If the document is not a digital document, then the document may be provided to the document digitizer 104 for digitization. If the digitized document identifier 124 identifies that the document is digitized then the document maybe directly provided to the document translator 106 for further processing.

The document digitizer 104 digitizes the non-digital documents from the document packet 150 and provides digitized versions of the non-digital documents for further processing. The document digitizer 104 can employ a plurality of digitization services 142, . . . , 148, such as different OCR platforms to generate a plurality of digitized versions and corresponding confidence scores for the digitized versions of a non-digital document. Although the plurality of digitization services 142, . . . , 148, are shown as included in the document digitizer 104, it can be appreciated that this is not necessary. Some of the digitization services can be included as part of the document digitizer 104 whereas other digitization services such as cloud-based digitization services may be accessible to the data validation system 100 without actually being included therein. The output from the plurality of digitization services 142, . . . , 148/OCR platforms can include not only predictions for the textual data in the machine-readable/processor-readable format but also the location/position of the word/character within the document and the confidence scores associated with each prediction. The confidence scores of the different digitized versions generated by one or more of the plurality of digitization services 142, . . . , 148, for a non-digital document can be compared and the digitized version with the highest confidence score can be selected for further processing.

The digitized documents with the errors corrected are provided to the document translator 106 for any necessary translation. In an example, the document translator 106 can implement language detection techniques such as but not limited to those based on Naïve Bayesian Algorithms to determine if the document is in English or a different (i.e., a non-English), language and if the document is in a different language, the language of the document is identified. If it is detected that the document is in English, then it is determined that no further translation is required. Therefore, the document can be provided to the digital document processor 108 for further processing such as an error correction, etc. If it is detected that the document is in a non-English language, then an appropriate translation service can be employed for translating the document into English. In an example, translation services such as but not limited to, Google Translate, Amazon Web Services (AWS), GeoFluent etc., can be employed for the translation.

The translated document is then provided to the digital document processor 108 data extraction. The digital document processor 108 can correct errors in the textual content or errors that can arise during the digitization process due to formatting issues, etc. Different corrections such as content corrections, domain corrections, and spelling corrections can be implemented in the error correction process which can use metrics such as weight ratio, edit distance, ratio of terra lengths, etc. for error correction. The digital document processor 108 can be further configured to classify each of the plurality of documents 152, . . . , 158, under a specific document category such as but not limited to, passports, identification documents such as drivers' licenses, income proofs, etc. The digital document processor 108 can include different field extraction models which are trained to identify and extract fields (e.g., field value or field name and value) that can be expected to occur in a specific document category. For example, Azure® OCR-Invoice and Google® OCR-Invoices can include field extraction models to extract fields that can occur in invoices, while Azure OCR-Receipts can include field extraction models trained to extract fields from receipts. In addition to the readily available pre-trained models, custom-trained models can also be used by the digital document processor 108 to extract fields for which pre-trained models may not be available. The custom-trained models can be trained on historical data via supervised or unsupervised training for extracting a particular field. In an example, fields may also be extracted via simple rules-based techniques.

In an example, multiple instances of fields can be extracted by different field extraction models when a document is provided to multiple ones of the plurality of digitization services 142, 148. For example, fields from an invoice can be extracted by Azure® OCR-Invoice and Google® OCR-Invoices along with the confidence scores. The confidence scores for the different instances for each field having multiple instances can be compared and the instance with the highest confidence score is selected. Therefore, consolidated results 172 or a consolidated set of fields can be produced from the different instances of a given field by the different field extraction models and stored in a data storage 170 of document validation system 100. The data storage 170 may be a local data storage of document validation system 100 which is used to store intermediate results e.g., different field instances, finalized/selected fields, etc. Different models can output the different field instances in corresponding JSON formats. The different JSON formats are transformed into a common format. The consolidated results 172 in the common format can be provided to the data validator 110 to be displayed to the user in a validation GUI 112 and/or provided to downstream processes. In an example, the data validator 110 can produce a web interface that interprets the common JSON formate to produce the validation GUI 112.

Figure 2:
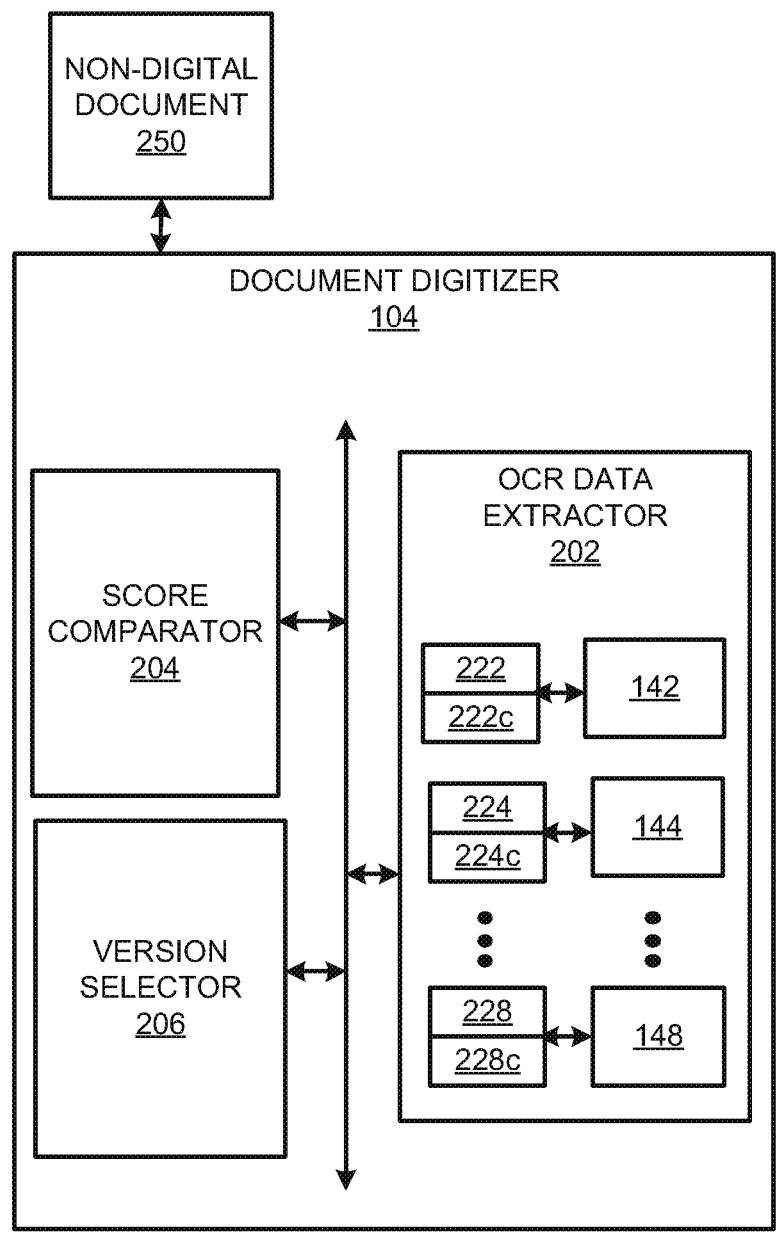
FIG. 2 shows a block diagram of a document digitizer in accordance with the examples disclosed herein.

FIG. 2 shows a block diagram of the document digitizer 104 in accordance with the examples disclosed herein. The document digitizer 104 includes an OCR data extractor 202, a score comparator 204, and a version selector 206. Among the plurality of documents 152, . . . , 158, of the document packet 150, a subset of documents may be digitized while other documents may not be digitized. The processor associated with document validation system 100 can identify the textual content and the position thereof within the digital documents whereas for the non-digital document (e.g., scanned image), the processor may not be able to identify the textual content nor determine the position of specific content within the document. The document digitizer 104 accesses those documents identified as non-digital by the digitized document identifier 124 e.g., non-digital document 250 for digitization so that the processor can determine the data and position of the textual content of the document.

As mentioned above, the document digitizer 104 includes an OCR data extractor 202 which can further include and/or access a plurality of digitization services 142, . . . , 148, such as different OCR platforms to generate the plurality of digitized versions 222, 224, . . . , 228, and corresponding confidence scores 222c, 224c, . . . , 228c, for the digitized versions of the non-digital document 250. Different OCR platforms such as but not limited to cloud OCR services such as AWS, Google Cloud Platform, Azure®, pre-trained models such as Azure OCR- Invoice, Azure OCR-Receipts, Google OCR-Invoices, GoogleOCR, Finance, on-prem services such as Tesseract OCR®, or other models custom-trained for specific documents, can constitute the plurality of digitization services 142, . . . , 148. The score comparator 204 compares the confidence scores 222c, 224c, . . . , 228c, to identify the highest confidence score. The version selector 206 selects a final digitized version e.g., the digitized version 224 from the plurality of digitized versions 222, 224, ..., 228, for further processing.

Figure 3A:
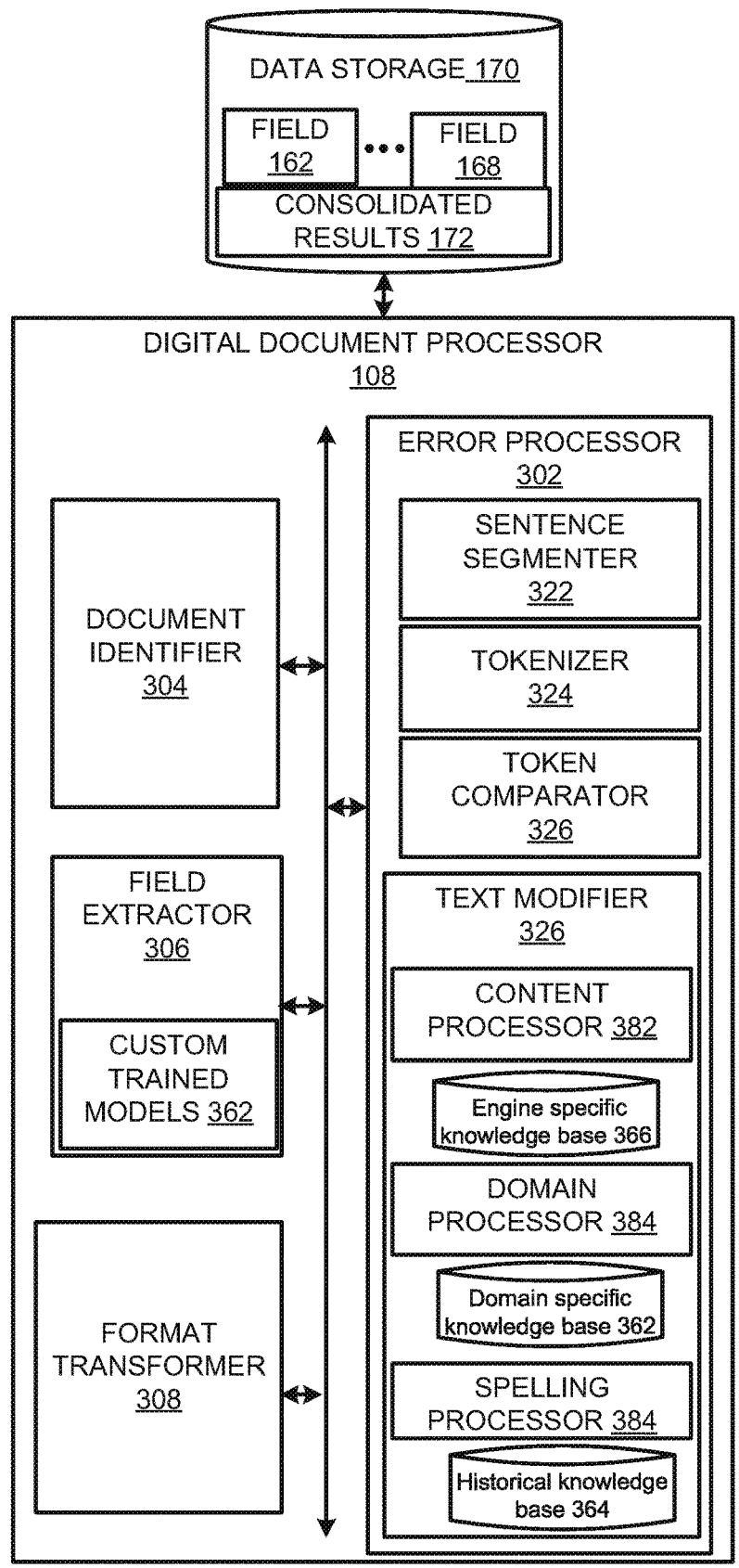
FIG. 3A shows a block diagram of a digital document processor in accordance with the examples disclosed herein.

FIG. 3A shows a block diagram of the digital document processor 108 in accordance with the examples disclosed herein. The digital document processor 108 includes an error processor 302, a field extractor 306, and a format translator 306. The error processor 302 analyzes the digital versions of the plurality of documents 152, ..., 158, to identify and correct errors in the textual content thereof. The error processor 302 can implement different types of correction techniques such as content correction, domain correction, and spelling correction. The processor 302 includes a sentence segmenter 322, a tokenizer 324, a token comparator 326, and a text modifier 328. The textual content of a digital document being processed can be broken up into a list of strings by the sentence segmenter 322. The strings are tokenized by the tokenizer 324 to generate a list of tuples. The token comparator 326, compares each token from the tuples to the keywords which are stored in different knowledge bases including domain-specific knowledge base 362, historical knowledge base 364, and engine specific knowledge base 366. In an example, content correction can be implemented by a content processor 382 as a general OCR character correction and generalization Word-like Python. For example, an OCR error that converts '1nvoicenumber: 1234' can be corrected to read as 'Invoice number: 1234'. Domain correction can be implemented by a domain processor 384 as document type knowledge like supplier, claim data, etc., and spelling correction can be implemented by a spelling processor 388 using Ginger IT and other Python Library for auto error correction. For example, a spelling error such as 'Soles Tax: $10' can be corrected to 'Sales Tax: $ 10' while a domain error 'Pizfer Inc.' can be corrected to 'Pfizer Inc.'. Errors can be identified using measured metrics such as weight ratio wherein a higher weight ratio is preferred as errors tend to occur much less often than the correct words. Edit distance is another metric that can be applied to match words from the digital document being analyzed with words from one of the knowledge bases based on the distance between two words. The ratio of term lengths is yet another useful differentiator that can be applied for error correction. In an example, the ratio of term lengths can be a measure of the frequency of a word (w) in a document (d). Term Frequency (TF) is defined as the ratio of a word's occurrence in a document to the total number of words in a document. The denominator term in the formula is to normalize since the corpus documents may be of different lengths.

Figure 3B:
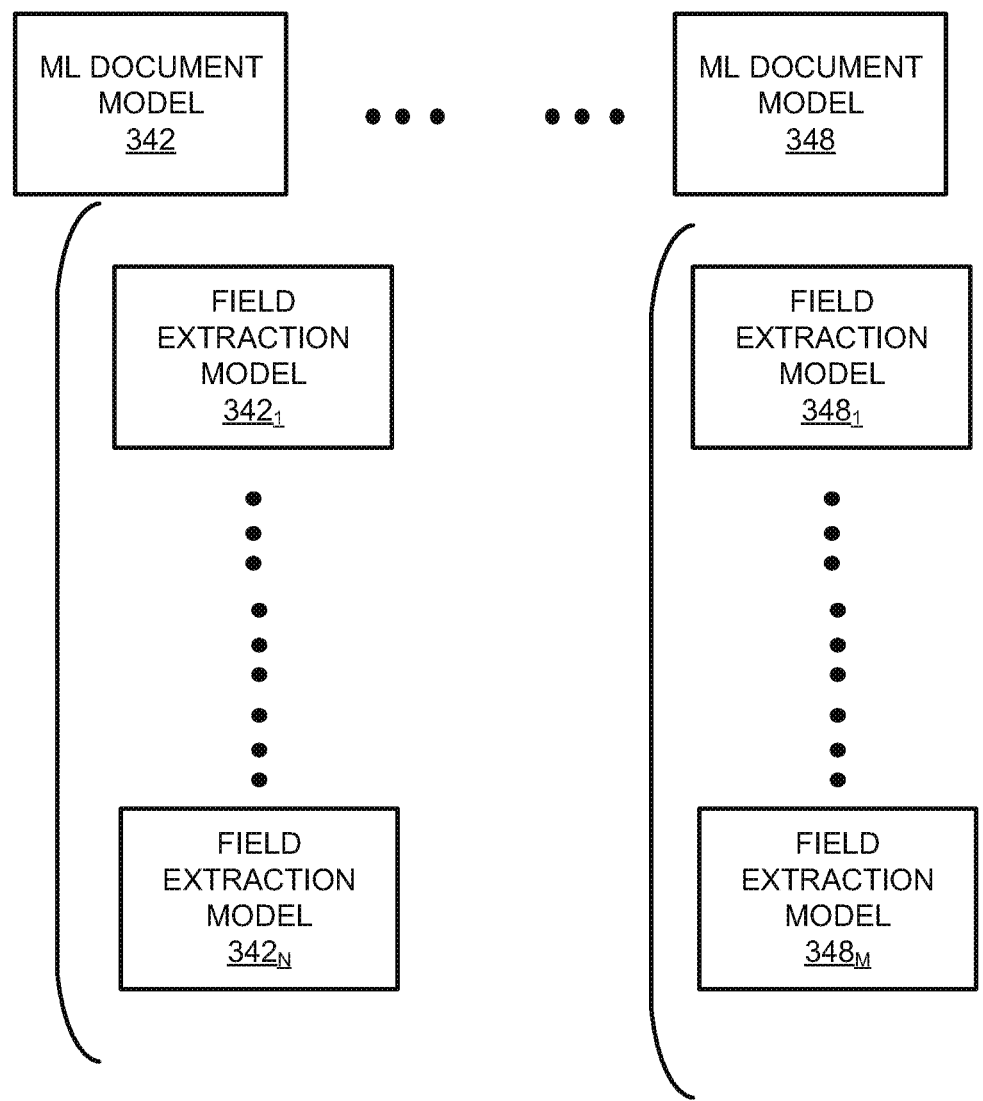
FIG. 3B, shows examples of a plurality of Machine Learning (ML) document models each of which is trained to identify a specific type of document.

As shown in FIG. 3B, the document identifier 304 can include a plurality of ML document models 342, ..., 348, each of which is trained to identify a specific type of document. In an example, the ML document models can include random forest, Naïve Bayes, etc. The plurality of ML document models can be trained via supervised training with labeled training data for field extraction from specific document types. By way of illustration and not limitation, document model 342 can be trained to identify and extract fields from passports, document model 344 can be trained to identify and extract fields from driver licenses, etc. In an example, metadata accompanying the document packet 150 can be employed to particularly identify documents. The metadata may be supplied by the user uploading the document packet 150. For example, the user may provide information regarding the specific documents and the number of pages in the document as metadata for the document packet 150. The plurality of ML document models 342, ..., 348, can include commercially available pre-trained models or custom models that are developed/customized for special documents, e.g., tax documents, income statements, etc.

The field extractor 306 accesses the digital versions of the plurality of documents 152, ..., 158, for analysis by pre-trained models included in the plurality of ML document models 342, ..., 348, and custom-trained models 362 for field extraction. Each ML document model e.g., an ML document model 342 that represents a specific document category/type can have a plurality of field extraction models e.g., field extraction models $342_1, \ldots 342_N$. Similarly, another ML document model 348 can have a plurality of field extraction models, e.g., field extraction model $348_1, \ldots 348_M$, associated therewith. Here N and M are natural numbers so that N=1 2, 3, ...; M=1, 2, 3, ... and N may nor may not be equal to M. This is because each field extraction model can be trained to extract one field and the number of fields to be extracted may be different for different document types. In addition, the field extractor also includes custom-trained models 362 which are trained to extract specific additional fields that may not occur in general document templates but occur infrequently in specific documents. For example, if an invoice document of an entity has a unique field that does not normally occur in invoices, the field extraction models associated with the plurality of ML document models 342, ..., 348, may not be configured to extract the unique field. Hence, the document validation system 100 has additional custom-trained models 362 which are trained on labeled training data for extracting the unique field. The digitized versions of each of the plurality of documents 152, ..., 158, is provided to the plurality of ML document models 342, ..., 348, which may produce multiple field instances for the different fields. In some examples, the multiple field instances may include duplicate field instances that are produced for the same field by different field extraction models associated with the different digitization services. In this case, confidence scores of the duplicate field instances are compared and the field instance with the highest score is selected for inclusion into the consolidated results 172.

The plurality of fields 162, ..., 168, thus extracted from different documents can be output by the corresponding field extraction models in different forms e.g., in different JSON formats. In order to be usable by the validation GUI 112 or one of the downstream processes, the outputs from the field extraction models $342_1, \ldots 342_N$, etc., need to be uniformly formatted. Therefore, the outputs from the different field extraction models $342_1, \ldots 342_N$, etc., are converted by the format transformer 308 into a uniform format. In an example, the format transformer 308 can be based on AI models such as but not limited to Support Vector Machines (SVMs), Linear Regression (LR), etc. The format transformer 308 can be trained via supervised training to transform a received JSON input into an output of common format. The outputs obtained from the format transformer 308 can be provided for validation/user review via the validation GUI 112 or for use by the downstream processes such as Enterprise Resource Planning (ERP) platforms, Robotic Process Automation (RPA) systems, etc.

3. Flowcharts,

FIG. 4 shows a flowchart 400 that details a method of processing documents in accordance with the examples disclosed herein. The method begins at 402 wherein the document packet 150 is received. At 404, each document is extracted as a separate file from the document packet 150. In an example, the metadata accompanying the document packet 150 can be employed to separate the plurality of documents 152, 154, ..., 158, from the document packet 150. The document packet 150 can include digital documents and non-digital documents. The non-digital documents are converted or digitized at 406 using the plurality of document digitization services 142, ..., 148. At 408 it is determined if one or more documents of the document packet 150 need to be translated. If it is determined at 408 that one or more of the plurality of documents 152, 154, ..., 158, can be translated, the method moves to 410 to translate the non-English documents into English to generate translated versions, and the method moves to directly to 412 wherein a digital document is selected from the plurality of documents 152, 154, ..., 158, for further processing. At 414, the selected document is made accessible to the different field extraction models.

The fields are extracted from the document at 416. At 420 it is determined if further documents remain for processing. If yes, the method returns to 412, wherein a document, is again selected for further processing. If it is determined at 420 that no further documents remain for processing from the plurality of documents 152, 154, ..., 158, the method moves to 422 wherein the output from the plurality field extraction models used for extracting the fields at 418 is transformed into a common JSON format and provided to the validation GUI 112 and/or downstream processes at 424.

Although it is described above that the documents are processed serially, it can be appreciated that the documents can also be processed in parallel in accordance with some examples.

Figure 5:
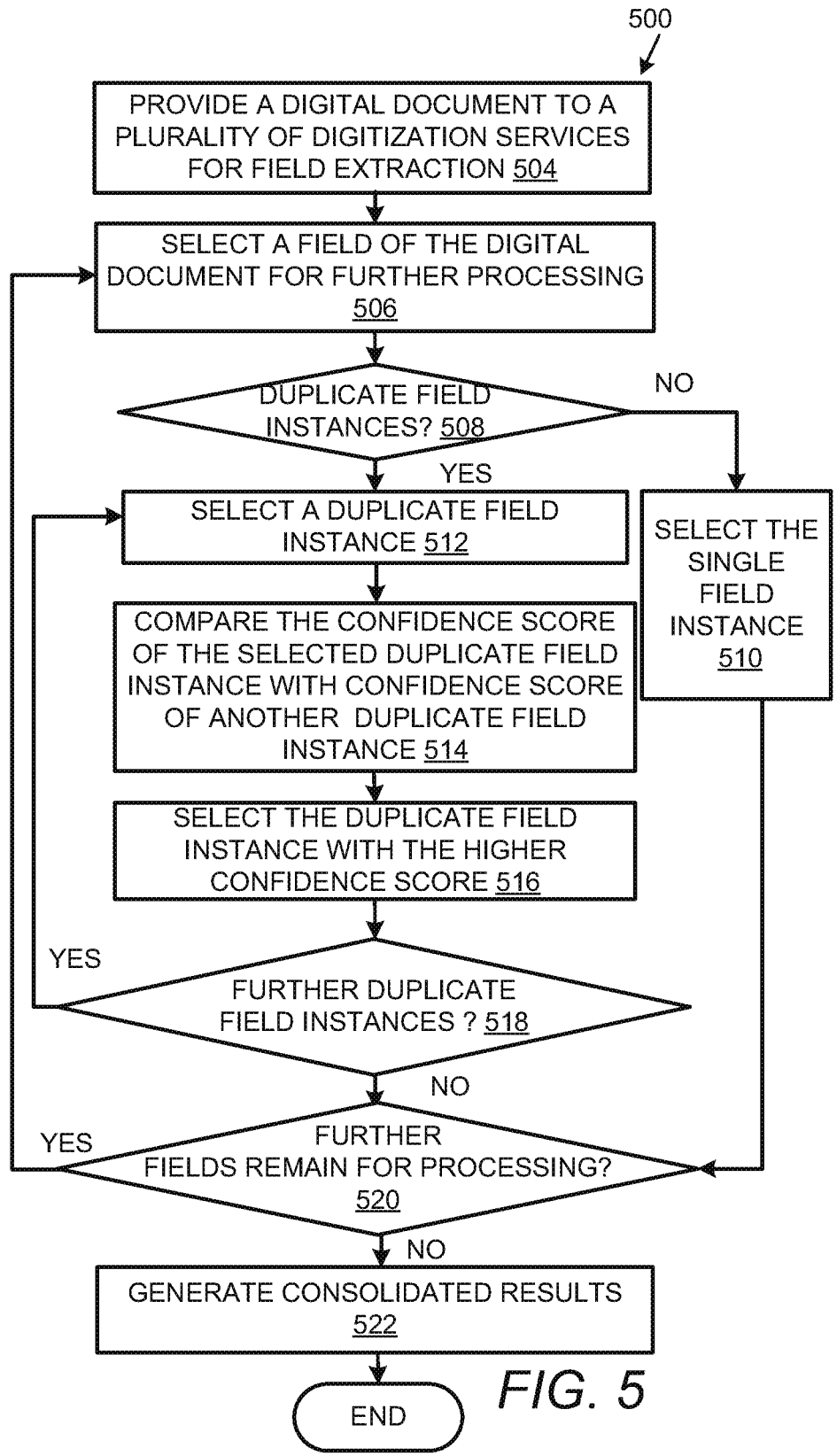
FIG. 5 shows a flowchart that details a method of generating a digitized version of a document in accordance with the examples disclosed herein.

FIG. 5 shows a flowchart 500 that details a method of generating a digitized version of a document in accordance with the examples disclosed herein. The method begins at 504 wherein a digital document in the document packet 150 is provided to a plurality of digitization services 142, ..., 148, such as different OCR platforms. While a non-digital document may be provided to the plurality of digitization services 142, 148, for digitization, the digital documents are also further processed by the plurality of digitization services 142, ..., 148, and the custom trained models 362 for field extraction. One of the fields is selected for further processing at 506. It is determined at 508 if the field has duplicate field instances generated by one or more of the plurality of digitization services 142, ..., 148. If the field does not have multiple field instances, the method moves to 510 wherein the single field instance is selected and the method moves to 522 if further fields remain to be processed for the digital document. For example, if only one of the custom-trained models 362 is configured for extracting that particular field, then a single field instance is generated.

If it is determined at 508 that the field has duplicate field instances, the method moves to 512 wherein one of the duplicate field instances generated by one of the plurality of digitization services 142, ..., 148, for the field is selected. The confidence score of the selected duplicate field instance is compared at 514 with the confidence score of another duplicate filed instance generated by another digitization service of the plurality of digitization services 142, ..., 148, for the same field. The duplicate field instance with the higher confidence score is selected at 516 so that the initially selected duplicate field instance is retained if its confidence score is higher, else the other duplicate field instance is selected if it has a higher confidence score than the initially selected field instance.

It is determined at 518 if further duplicate field instances remain to be processed. If yes, the method returns to 512 wherein another duplicate field instance is selected for further comparison operations. Else the method proceeds to 520 to determine if further fields remain to be processed. If yes, the method returns to 506 to select the next field. In an example, the fields may be selected in the order of occurrence in the digital document being processed. In an example, the fields may be selected randomly or per other criteria. If it is determined at 520 that no further fields remain to be processed, the method concludes at 522 wherein the consolidated results are generated wherein for each field, a field instance generated by one of the plurality of digitization services 142, ..., 148, with the highest confidence score is selected for inclusion into the consolidated results 172. Therefore, the consolidated results 172 can include fields extracted from the digital document by different models e.g., pre-trained models and/or custom-trained models with the highest confidence scores.

Figure 6:
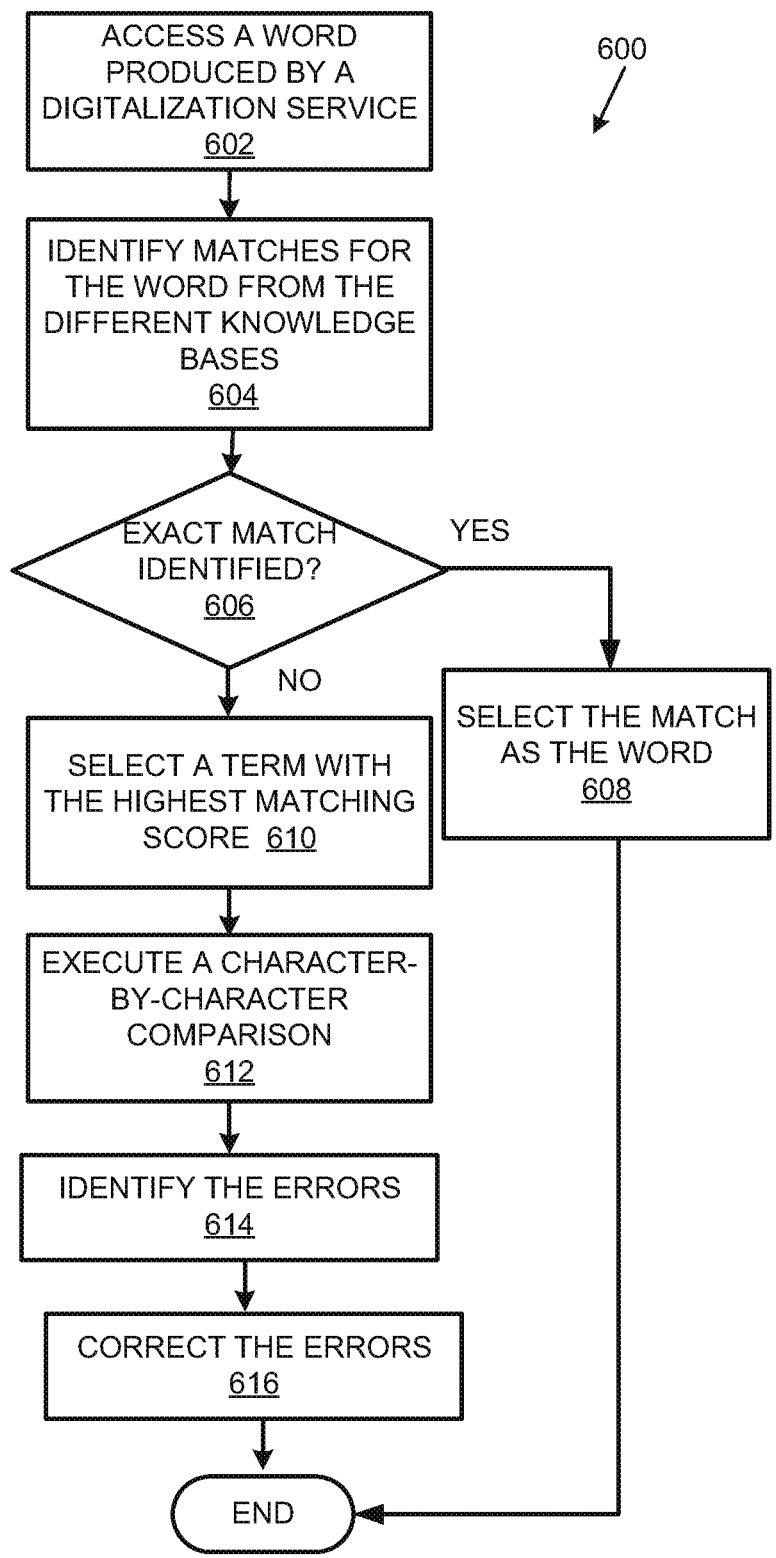
FIG. 6 shows a flowchart that details a method of correcting errors in the OCR output in accordance with the examples disclosed herein.

FIG. 6 shows a flowchart 600 that details a method of correcting errors in the OCR output in accordance with the examples disclosed herein. The method begins at 602 wherein a word from the output of one of the digitization services is accessed. At 604, matches for the word from the various knowledge bases including the engine-specific knowledge base 366, domain-specific knowledge base 362, and historical knowledge base 364 are identified. It is determined at 606 if an exact match has been identified for the word. An exact match may be identified if the confidence score substantially 100% for the match. If an exact match is identified at 606, it is selected as the word at 608 and the method terminates on the end block. If an exact match is not identified at 606, a term with the highest matching score from the terms selected from the different knowledge bases is selected at 610. A character-by-character comparison is executed between the word and the term with the highest matching score at 612. Errors in the word are identified based on the character comparison at 614 and corrected at 616.

Various algorithms can be implemented to correct the errors. Example algorithms and their order of execution are described below. It can be appreciated that the algorithms and their execution order are described below for illustrative purposes only and that different algorithms can be executed in different orders per the examples described herein.

1: Hamming Distance—Hamming distance is the distance calculated between two strings of equal length. Hamming distance gives a count of characters that don't match a given corresponding index. For example: 'Cat' & 'Cet' has hamming distance 1 as at index 1, 'a' is not equal to 'e'.

2: Levenstein Distance—Levenstein Distance calculates the minimum number of edits required to convert 'Str1' to Str2' by performing either Addition, Removal, or Replace characters. Hence strings 'Cat' & 'Bat' have an edit distance of '1' (Replace 'C' with 'B') while for 'Ceat' & 'Bat', it would be 2 (Replace 'C' with 'B'; and Delete 'e').

3: Damerau Levenstein Distance—Consider two strings, str 1 'abcd' and str 2 'acbd'. Applying the Levenstein Distance technique to these strings, the character 'b' will be replaced by character 'c' while the character 'c' will be replaced by the character 'b' at index positions 2 and 3 in str 2. However, it may be noted that both the characters got swapped in str1, and introducing a new operation 'Swap' alongside 'addition', 'deletion' & 'replace', can solve this problem.

Burkhard Keller (BK) Tree—BK tree is amongst the fastest algorithms to find out similar strings (from a pool of strings). For a given string, the BK tree uses 1. Levenstein Distance and 2. Triangle inequality to figure out similar strings (and not just one best string). A BK tree is created using a pool of words from an available dictionary, e.g., similar strings can be identified from a dictionary D={Book, Books, Cake, Boo, Boon, Cook, Cape, Cart}.

5: Bitmap algorithm—It is another fast algorithm that can be used for efficient fuzzy string matching. This is because it uses bitwise operations that are quite fast. This algorithm is known for its speed. A typical problem statement can be described as: Given a text txt[0 . . . n-1] and a pattern pat[0 . . . m-1] where n is the length of the text and m is the length of the pattern, write a function search(char pat[], char txt[ ]) that prints all occurrences of pat[] in txt[ ]. Example input and output(s) for the Bitmap algorithm can be defined as:

Input: txt[ ]="THIS IS A TEST TEXT"
pat[ ]="TEST"
Output: Pattern found at index 10
Input: txt[ ]="AABAACAADAABAABA"
pat[ ]="AABA"
Output: Pattern found at index 0
Pattern found at index 9
Pattern found at index 12

4. User Interfaces, Models, and Code

Figure 7:
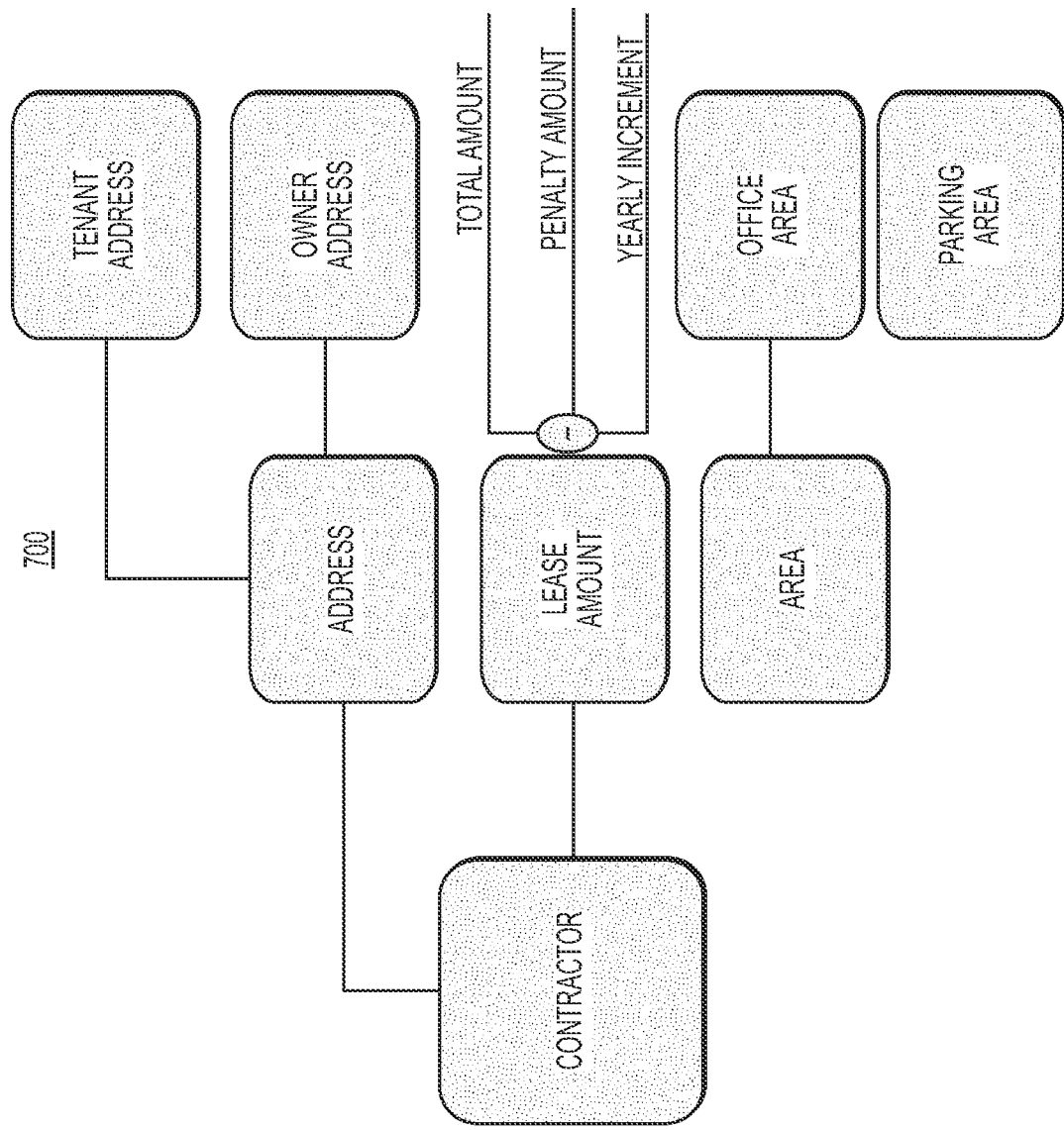
FIG. 7 shows an example model that can be implemented by the digital document processor following the methods described herein.

FIG. 7 shows an example model 700 that can be implemented by the digital document processor 108. The model 700 corresponds to a contractor having an address, lease amount, and area fields which have further fields viz., tenant address, owner address, office area, and parking area. The lease amount has total amount, penalty amount, and Yearly income as sub-fields. One or more of the above-mentioned fields can be extracted by the pre-trained models while the other fields may need to have models custom trained for the field extraction.

Figure 8:
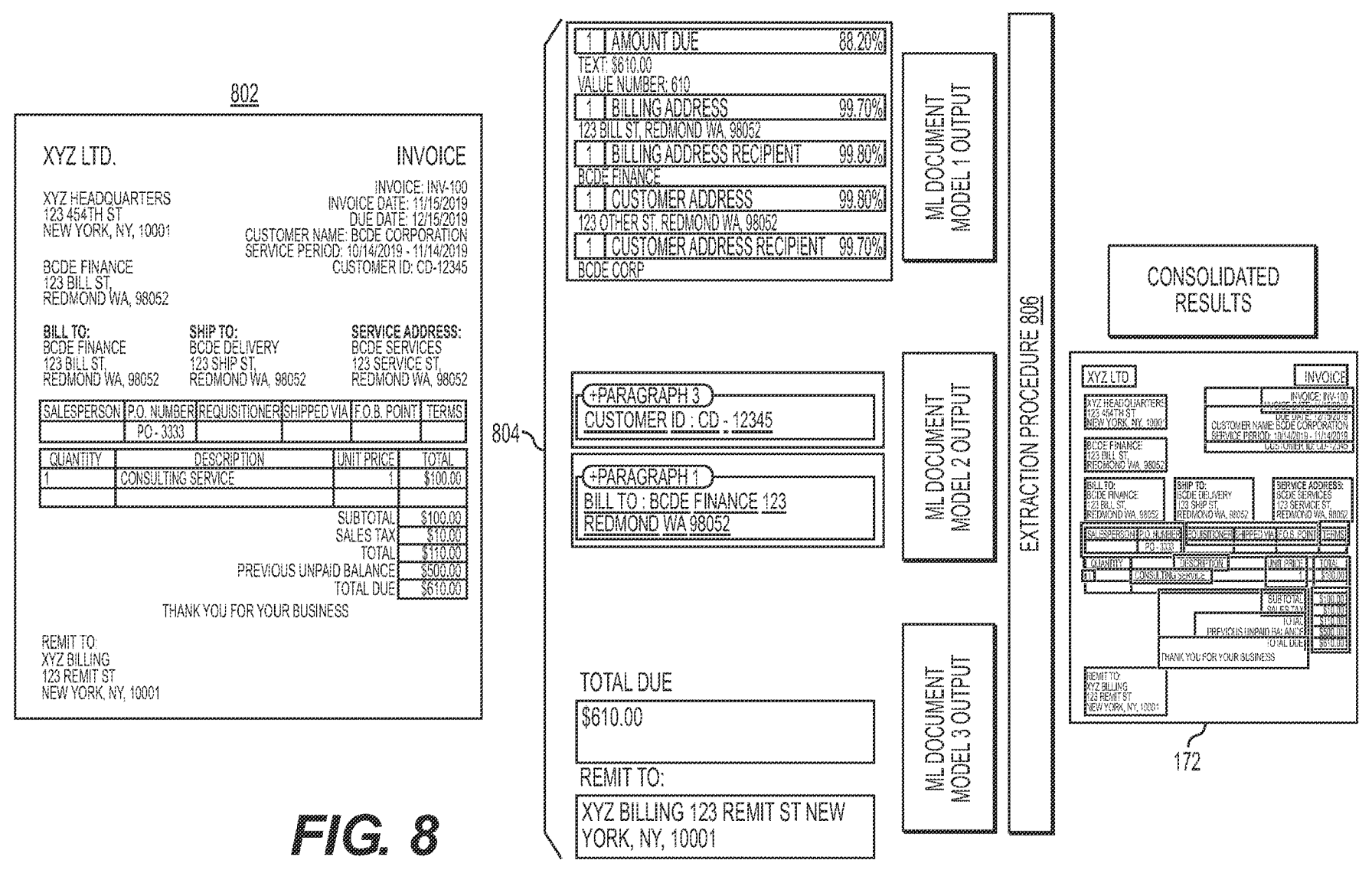

FIG. 8 shows field extraction by different models in accordance with the methods described herein. It can be appreciated that the fields are described below for illustration purposes and that the fields extracted can depend on the documents and the models used for the field extraction. An input document 802 is provided to different ML document models which generate the corresponding outputs 804, ML document model output 1, ML document model output 2, and ML document model output 3. A further extraction procedure 806 produces the consolidated results 172 which includes each of the fields and positions thereof from the input document 802 extracted by the different ML document models 804 having the highest confidence scores.

The ML document model output 1 includes not only the fields but also the confidence values associated with fields. For example, the confidence value of 'Amount Due' 812 is 88.20% whereas the 'Billing Address' field has a confidence value of 99.7%. Therefore, the consolidated results may not include the 'Amount Due' field which can be selected from another ML document model output that may have a higher confidence value whereas the 'Billing Address' field may be selected for inclusion into the consolidated results 172. The ML document model output 2 can include the fields as well as the positions of the fields. For example, 'Customer ID' and 'Bill To' are positioned at Paragraph 3 and Paragraph 1 respectively. Similarly, the ML document model 3 output includes the 'Total due' and 'Remit To' fields. The consolidated results 172, therefore, include the fields extracted by the plurality of ML document models.

Figure 9:
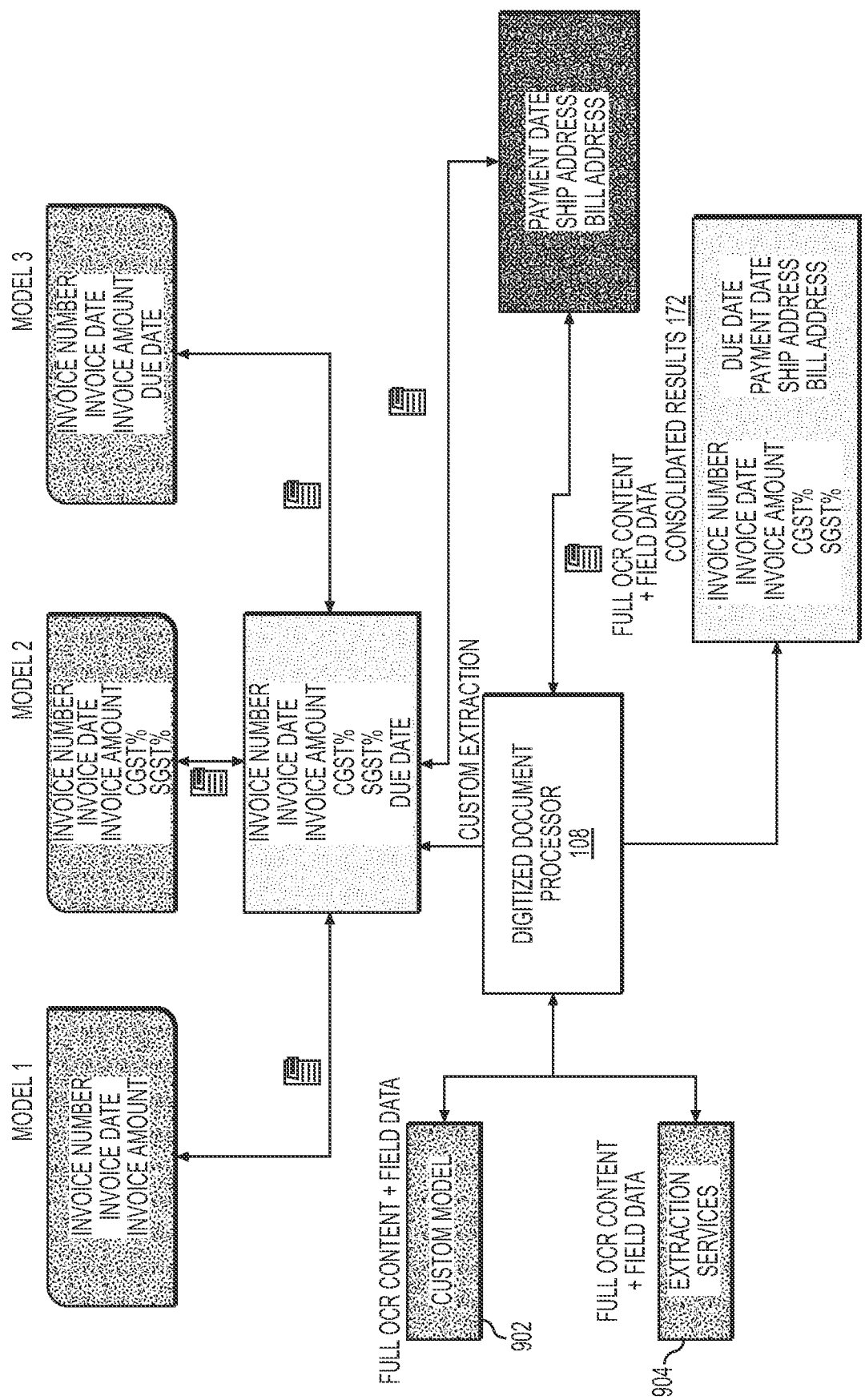
FIG. 9 shows some example fields extracted by the different ML document models in accordance with the methods disclosed herein.

FIG. 9 shows some examples of fields extracted by the different ML document models in accordance with the methods disclosed herein. For example, fields can be extracted by the pre-trained models, model 1, model 2, and model 3. Model 1 has extracted fields, 'invoice number', 'invoice date', and 'invoice amount'. Model 2 has extracted fields 'invoice number', 'invoice date', 'invoice amount', 'CGST %', and 'SGST %'. Model 3 has extracted fields 'invoice number', 'invoice date', invoice amount', and 'due date'. In addition, custom models 902 and extraction services 904 can be used for the extraction of additional fields including 'payment date', 'ship address', and 'bill address'. Therefore, the consolidated results can include all the fields extracted by the different models. It may be noted that model 1, model 2, and model 3 have all extracted duplicate field instances for 'invoice number', 'invoice date', and 'invoice amount' fields. Accordingly, the field instance with the highest confidence score is selected for inclusion into the consolidated results 172.

Figure 10:
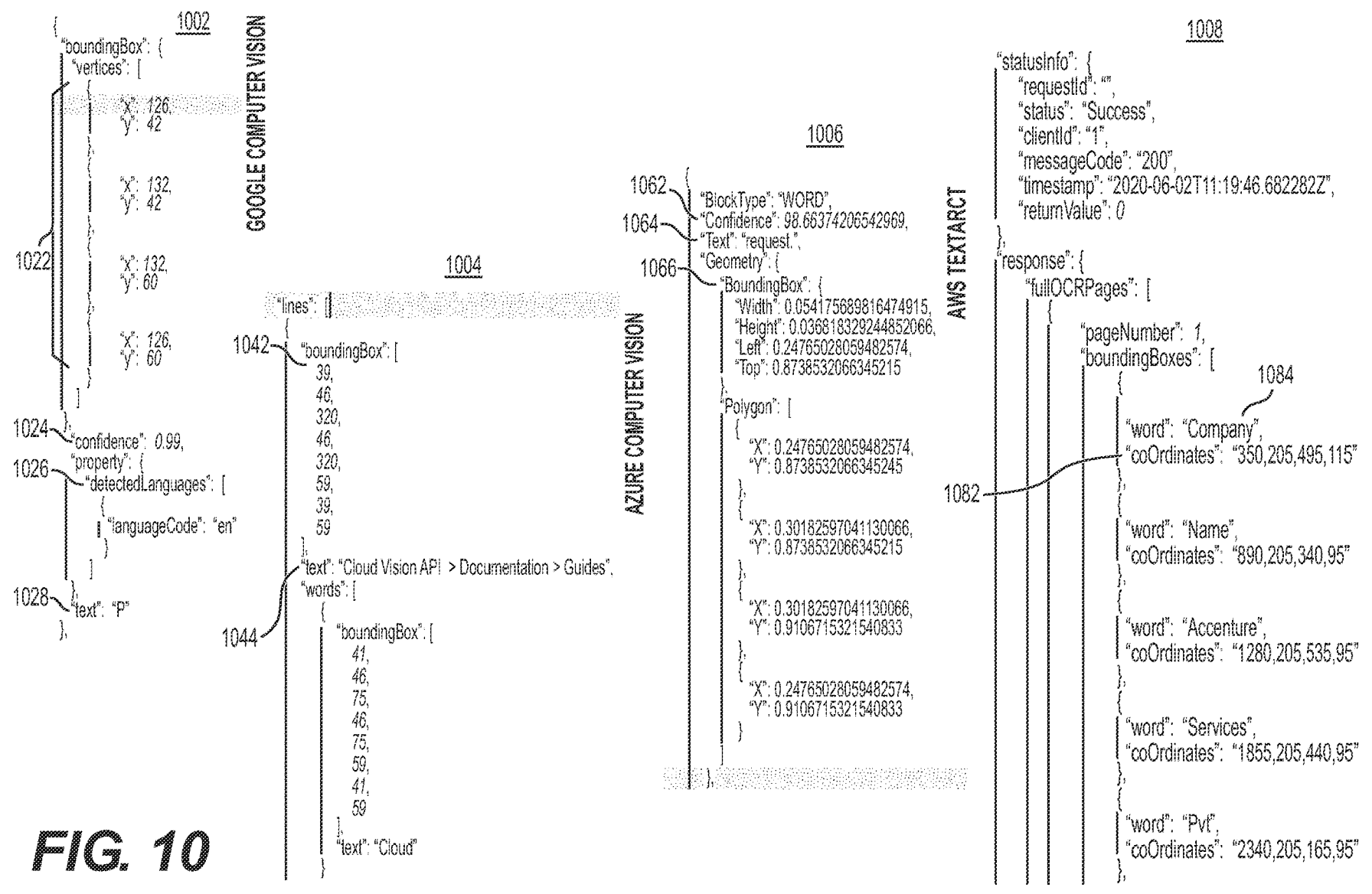

FIG. 10 shows examples of different JSON outputs provided by the different field extraction models and the common JSON format generated in accordance with the examples disclosed herein. The JSON output 1002 is produced by the Google® Computer Vision platform. It includes vertices of the bounding box around the field 1022, the confidence score 1024 associated with the field, the detected language 1026, and the actual data 1028. The Azure® output 1004 includes the bounding box coordinates 1042 and the textual content 1044. The AWS extract 1006 also includes the confidence value 1062, the text 1064, and the bounding box coordinates 1066. However, it may be noted that the bounding box coordinates 1022, the bounding box coordinates 1042, and the bounding box coordinates 1066 are given in different formats. The document validation system 100 is configured to compare the bounding box coordinates given in different formats that refer to the same piece of text and output the coordinates in the common format in the Final transformed OCR 1008 which can include the words 1084 and the coordinates 1082 in addition to other data.

Figure 11:
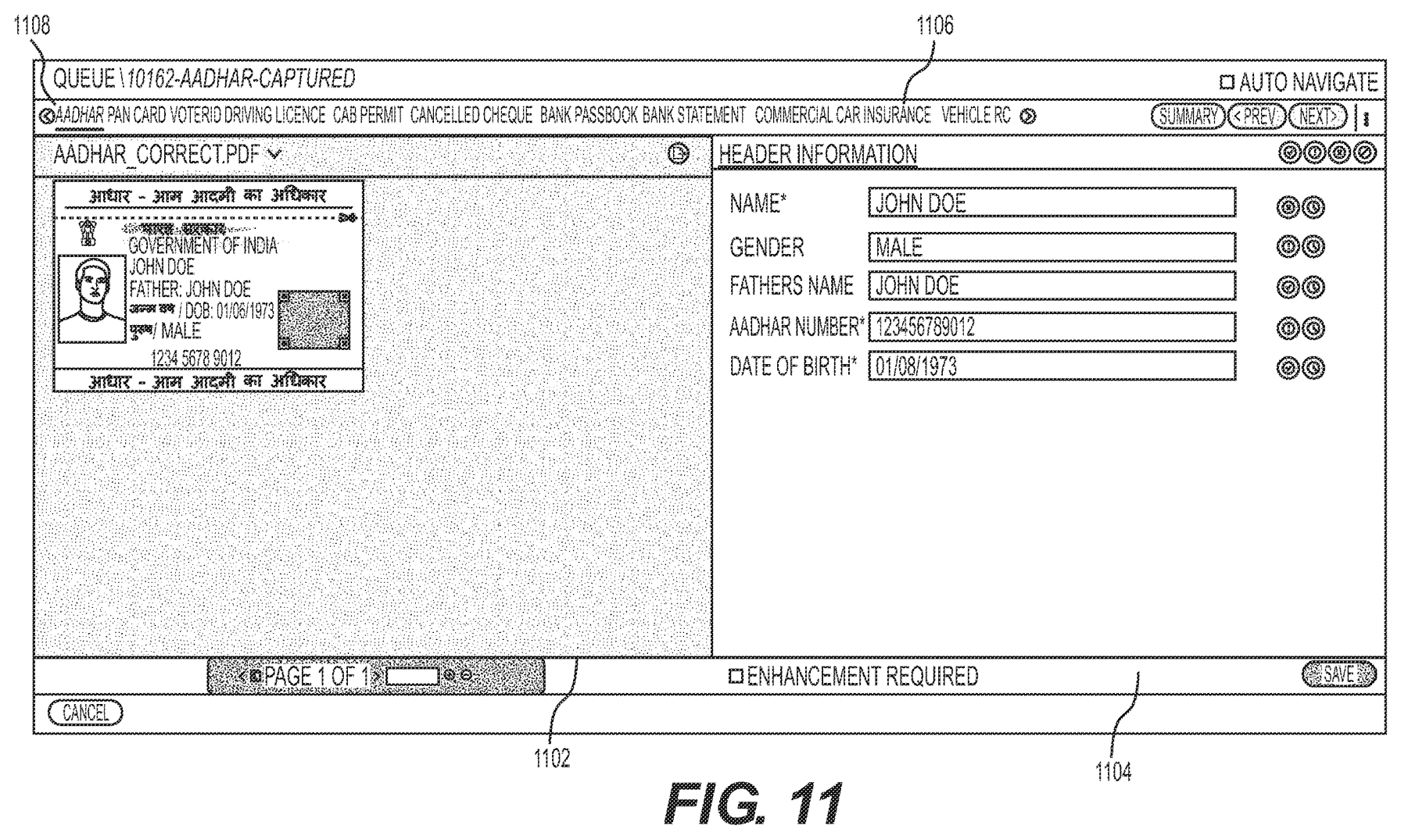

FIG. 11 shows an example of the validation GUI 112 generated in accordance with the examples disclosed herein. The example validation GUI 112 pertains to driver onboarding for a taxi cab service. The various documents extracted from the document packet 150 can be accessed via the navigation bar 1106. On the left-hand side (LHS) 1102, the validation GUI 112 displays the original document(s) while the fields extracted from the document are displayed on the LHS 1102 are displayed on the right-hand side (RHS) 1104. A first document namely 'Aadhar' 1108 is initially identified from the document packet 150 which is shown on the LHS 1102. The various fields including name, Gender, Father's name, etc., in Aadhar 1108 are given in Hindi—non-English language that needs to be translated via the document translator 116 and provided in English on the RHS 1104. Upon verifying the details, another document can be selected on the navigation bar 1106.

Figure 12:
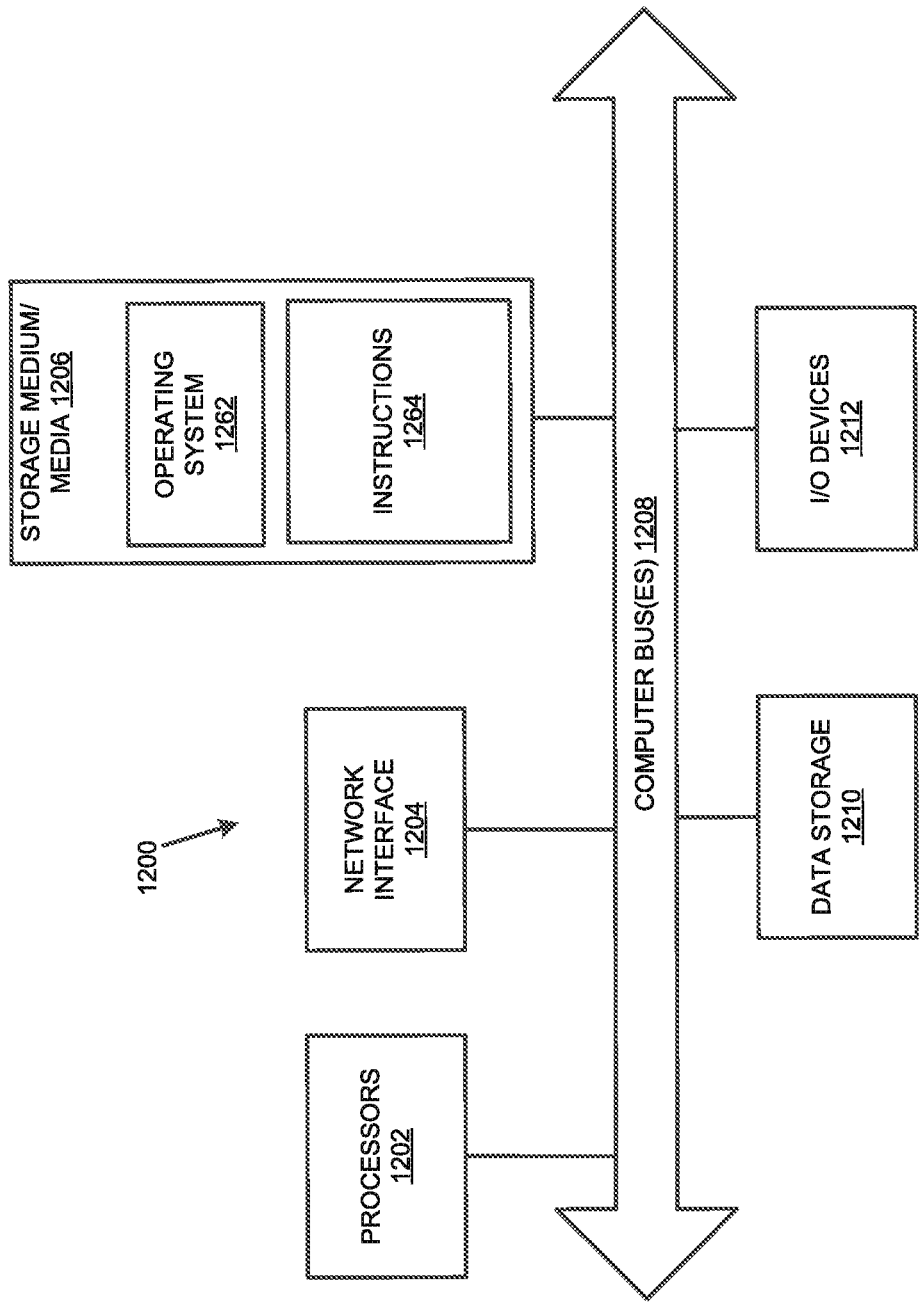
FIG. 12 illustrates a computer system that may be used to implement the AI-based document processing system according to some examples disclosed herein.

FIG. 12 illustrates a computer system 1200 that may be used to implement the AI-based document digitization and validation system 100 in accordance with the examples disclosed herein. More particularly, computing machines such as desktops, laptops, smartphones, tablets, and wearables which may be used to generate or access the data from the AI-based document digitization and validation system 100 may have the structure of the computer system 1200. The computer system 1200 may include additional components not shown and that some of the process components described may be removed and/or modified. In another example, a computer system 1200 can sit on external-cloud platforms such as Amazon Web Services, AZURE® cloud or internal corporate cloud computing clusters, or organizational computing resources, etc.

The computer system 1200 includes processor(s) 1202, such as a central processing unit ASIC or another type of processing circuit, input/output devices 1212, such as a display, mouse keyboard, etc,, a network interface 1204, such as a Local Area Network (LAN), a wireless 802.11x LAN, a 3G, 4G or 12G mobile WAN or a WiMax WAN, and a processor-readable medium 1206. Each of these components may be operatively coupled to a bus 1208. The processor-readable or computer-readable medium 1206 may be any suitable medium that participates in providing instructions to the processor(s) 1202 for execution. For example, the processor-readable medium 1206 may be a non-transitory or non-volatile medium, such as a magnetic disk or solid-state non-volatile memory, or a volatile medium such as RAM The instructions or modules stored on the processor-readable medium 1206 may include machine-readable instructions 1264 executed by the processor(s) 1202 that cause the processor(s) 1202 to perform the methods and functions of the AI-based document digitization and validation system 100.

The AI-based document digitization and validation system 100 may be implemented as software or machine-readable instructions stored on a non-transitory processor-readable medium and executed by one or more processors 1202. For example, the processor-readable medium 1206 may store an operating system 1212, such as MAC OS, MS WINDOWS, UNIX, or LINUX, and code 1214 for the AI-based document digitization and validation system 100, The operating system 1262 may be multi-user, multiprocessing, multitasking, multithreading, real-time, and the like. For example, during runtime, the operating system 1212 is running and the code for the AI-based document processing system 100 is executed by the processor(s) 1202.

The computer system 1200 may include a data storage 1210, which may include non-volatile data storage. The data storage 1210 stores any data used by the AI-based document digitization and validation system 100. The data storage 1210 may be used as the data storage 170 to store the fields, the consolidated results 172, and other data elements which are generated and/or used during the operation of the AI-based document digitization and validation system 100.

The network interface 1204 connects the computer system 1200 to internal systems for example, via a LAN. Also, the network interface 1204 may connect the computer system 1200 to the Internet. For example, the computer system 1200 may connect to web browsers and other external applications and systems via the network interface 1204.

What has been described and illustrated herein is an example along with some of its variations. The terms, descriptions, and figures used herein are set forth by way of illustration only and are not meant as limitations. Many variations are possible within the spirit and scope of the subject matter, which is intended to be defined by the following claims and their equivalents.

What is claimed is:

1. An Artificial Intelligence (AI) based document digitization and validation system, comprising:
   at least one processor;
   a non-transitory processor-readable medium storing machine-readable instructions that cause the processor to:
   extract individual documents in a document packet including a plurality of documents, wherein the plurality of documents include at least one non-digital document;
   convert the at least one non-digital document into a plurality of digitized versions,
      wherein the plurality of digitized versions are obtained from the plurality of digitization services;
   obtain corresponding confidence scores for the plurality of digitized versions from the plurality of digitization services;
   compare the corresponding confidence scores of the plurality of digitized versions of the at least one non-digital document;
   select a final digitized version of the non-digital document for further processing based on the corresponding confidence scores, wherein one of the plurality of digitized versions with a highest corresponding confidence score of the corresponding confidence scores is selected as the final digitized version;
   extract corresponding field instances of one or more fields from the plurality of documents with the at least one non-digital document replaced by the final digitized version,
      wherein the corresponding field instances are extracted in different formats from a plurality of field extraction models,
      wherein the corresponding field instances include duplicate field instances for at least one field of the one or more fields, and
      wherein the duplicate field instances are generated by at least two different field extraction models of the plurality of field extraction models;
   select a single field instance for the at least one field, wherein the single field instance has a highest confidence score of the duplicate field instances;
   convert the corresponding field instances in different formats into a common format;
   generate consolidated results including the corresponding field instances of each of the one or more fields converted into the common format; and
   output the consolidated results via one of a validation graphical user interface (GUI) or downstream process automation.

2. The document validation system of claim 1, wherein to extract the individual documents in the document packet the processor is to further:
   identify the individual documents of the plurality of documents using at least one of a rule-based classifier and a machine-learning (ML) based classifier.

3. The document validation system of claim 1, wherein the processor is to further:
   identify one or more documents of the plurality of documents that are in non-English languages; and
   generate translated textual content of the one or more documents into English.

4. The document validation system of claim 3, wherein the processor is to further:
   identify errors in textual content of the plurality of documents, wherein the textual content includes the translated textual content; and
   correct the errors using one or more of weight ratio, edit distance and ratio of term lengths.

5. The document validation system of claim 4, wherein the errors include one or more of content errors, domain errors, and spelling errors.

6. The document validation system of claim 1, wherein to extract the corresponding field instances, the processor to further:
   provide the plurality of documents to a plurality of machine learning (ML) document models associated with the plurality of digitization services, wherein each ML model of the plurality of ML document models is trained for classification of a corresponding document type and each of the plurality of ML document models is associated with a subset of the plurality of field extraction models.

7. The document validation system of claim 6, wherein to extract the corresponding field instances of the one or more fields, the processor is to:
obtain confidence scores of each of the corresponding field instances generated by the plurality of field extraction models.

8. The document validation system of claim 1, wherein to select the single field instance for the at least one field, the processor is to:
compare the confidence scores of the duplicate field instances for the at least one field of the one or more fields.

9. The document validation system of claim 1, wherein to select the single field instance for the at least one field, the processor is to:
train the plurality of field extraction models that include at least customized models using labeled training data to identify a corresponding field wherein the plurality of field extraction models include both pre-trained models and the customized models.

10. The document validation system of claim 1, wherein to generate the consolidated results, the processor is to further:
access corresponding Javascript Object Notation (JSON) output generated by the plurality of field extraction models, wherein at least a subset of the plurality of field extraction models generate JSON outputs in different formats.

11. The document validation system of claim 10, wherein to generate the consolidated results, the processor is to further:
transform the corresponding JSON outputs of the subset of field extraction models into a common format.

12. The document validation system of claim 1, wherein the processor is to further:
receive the document packet via one of accessing an email inbox, an Application Programming Interface (API), and a Secure File Transfer Protocol (SFTP).

13. A method of processing documents comprising:
accessing a document packet including a plurality of documents and metadata associated with the plurality of documents, wherein the plurality of documents include at least one non-digital document;
individually extracting the plurality of documents from the document packet using the metadata;
converting the at least one non-digital document into a plurality of digitized versions,
wherein the plurality of digitized versions are obtained from the plurality of digitization services;
obtaining corresponding confidence scores for the plurality of digitized versions from the plurality of digitization services;
comparing the corresponding confidence scores of the plurality of digitized versions of the at least one non-digital document;
selecting a final digitized version of the non-digital document for further processing, based on the corresponding confidence scores, wherein one of the plurality of digitized versions with a highest corresponding confidence score of the corresponding confidence scores is selected as the final digitized version;
extracting corresponding field instances of one or more fields from the plurality of documents with the at least one non-digital document replaced by the final digitized version,
wherein the corresponding field instances are extracted in different formats from a plurality of field extraction models,
wherein the corresponding field instances include duplicate field instances for at least one field of the one or more fields, and
wherein the duplicate field instances are generated by at least two different field extraction models of the plurality of field extraction models;
selecting a single field instance for the at least one field from the duplicate field instances, wherein the single field instance has a highest confidence score of the duplicate field instances;
converting the corresponding field instances in different formats into a common format;
generating consolidated results including the corresponding field instances for each of the one or more fields converted into the common format; and
enabling display of the consolidated results a validation graphical user interface (GUI).

14. The method of claim 13 wherein selecting the final digitized version of the non-digital document further includes:
comparing the corresponding confidence scores of the plurality of digitized versions generated by the plurality of digitization services.

15. The method of claim 13, wherein extracting the corresponding field instances of the one or more fields using the plurality of field extraction models further includes:
training at least one custom model for identifying at least one field of the one or more fields via supervised training techniques, wherein the at least one custom model is included in the plurality of field extraction models.

16. The method of claim 13, wherein extracting the corresponding field instances of the one or more fields using the plurality of field extraction models further includes:
employing at least one pre-trained model for identifying at least one field of the one or more fields wherein the at least one pre-trained model is associated with one of the plurality of digitization services.

17. The method of claim 13, further comprising:
identifying at least one non-English document from the plurality of documents.

18. A non-transitory processor-readable storage medium comprising machine-readable instructions that cause a processor to:
extract individual documents in a document packet including a plurality of documents, wherein the plurality of documents include at least one non-digital document;
convert the at least one non-digital document into a plurality of digitized versions,
wherein the plurality of digitized versions are obtained from the plurality of digitization services;
obtain corresponding confidence scores for the plurality of digitized versions from the plurality of digitization services;
compare the corresponding confidence scores of the plurality of digitized versions of the at least one non-digital document;
select a final digitized version of the non-digital document for further processing based on the corresponding confidence scores, wherein one of the plurality of digitized versions with a highest corresponding confidence score of the corresponding confidence scores is selected as the final digitized version;

extract corresponding field instances of one or more fields from the plurality of documents with the at least one non-digital document replaced by the final digitized version,
   wherein the corresponding field instances are extracted in different formats from a plurality of field extraction models, and
   wherein the multiple field instances include duplicate field instances for at least on field of the one or more fields;

select a single field instance for the at least one field, wherein the single field instance has a highest confidence score of the duplicate field instances;

convert the corresponding field instances in different formats into a common format;

generate consolidated results including the corresponding field instances of each of the one or more fields converted into the common format; and output the consolidated results via one of a validation graphical user interface (GUI) or downstream process automation.

19. The non-transitory processor-readable storage medium of claim 18, wherein the plurality of digitization services are associated with a plurality of Machine Learning (ML) document models.

20. The non-transitory processor-readable storage medium of claim 19, wherein at least a subset of the plurality of field extraction models are associated with the plurality of ML document models.

* * * * *